(12) United States Patent
Guyonnet et al.

(10) Patent No.: US 7,441,955 B2
(45) Date of Patent: Oct. 28, 2008

(54) RADIO-TRANSPARENT REAL-TIME DOSIMETER FOR INTERVENTIONAL RADIOLOGICAL PROCEDURES

(75) Inventors: Jean-Louis Guyonnet, Soultz-les-Bains (FR); Josian Cailleret, Achenheim (FR); Luc Mertz, Hochfelden (FR); Denis Staub, Strasbourg (FR)

(73) Assignees: Centre National de la Recherche Scientifique (CNRS); Universite Louis Pasteur; Hopitaux Universitaires de Strasbourg, Strasbourg (FR)

( * ) Notice: Subject to any disclaimer, the term of this patent is extended or adjusted under 35 U.S.C. 154(b) by 400 days.

(21) Appl. No.: 10/541,440

(22) PCT Filed: Jan. 6, 2004

(86) PCT No.: PCT/FR2004/000005

§ 371 (c)(1),
(2), (4) Date: Jul. 5, 2005

(87) PCT Pub. No.: WO2004/070420

PCT Pub. Date: Aug. 19, 2004

(65) Prior Publication Data

US 2006/0153341 A1    Jul. 13, 2006

(30) Foreign Application Priority Data

Jan. 7, 2003    (FR) .................................. 03 00100

(51) Int. Cl.
*G01D 18/00*    (2006.01)
*H05G 1/64*    (2006.01)

(52) U.S. Cl. ....................... 378/207; 378/98.3; 378/98.8
(58) Field of Classification Search ................ 378/98.8, 378/64, 65, 119, 121, 207, 62, 108, 98.3
See application file for complete search history.

(56) References Cited

U.S. PATENT DOCUMENTS 6,320,935 B1 *  11/2001  Shinar et al. ................ 378/119

(Continued)

FOREIGN PATENT DOCUMENTS

EP    1167999    1/2002

OTHER PUBLICATIONS

French Preliminary Search Report dated Oct. 14, 2003 for parallel French patent application No. 0300100.

(Continued)

*Primary Examiner*—Irakli Kiknadze
(74) *Attorney, Agent, or Firm*—Marshall, Gerstein & Borun LLP

(57) ABSTRACT

A method of measuring in real time a dose of radiological radiation absorbed by a region under inspection subjected to a flux of radiological radiation, the method comprising the steps consisting in: a) detecting the incident radiation at at least one point of the region under inspection using at least a first bundle of measurement optical fibers (2) containing at least one fiber placed in said region under inspection and adapted to generate a light signal on receiving radiological radiation; b) measuring said light signal away from the region under inspection after it has been transmitted along the measurement optical fiber; and c) determining the dose of radiological radiation received by said measurement optical fiber on the basis of said light signal.

23 Claims, 3 Drawing Sheets

U.S. PATENT DOCUMENTS

2005/0159903 A1* 7/2005 Ogura ........................ 702/40

OTHER PUBLICATIONS

"Evaluation of an On-line Patient Exposure Meter in Neuroradiology", Gkanatsios et al., Medical Physics, vol. 203, No. 3, Jun. 1997.
"Patient Dosimetry in Interventional Radiology Using Slow Films", Vano et al., The British Journal of Radiology, Feb. 1997.
"Suitability of Laser Stimulated TLD Arrays as Patient Dose Monitors in High Dose X-ray Imaging", Geise et al., Medical Physics, vol. 24, No. 10, Oct. 1997.
"Evaluation of a MOSFET Radiation Sensor for the Measurement of Entrance Surface Dose in Diagnostic Radiology", Peet et al., The British Journal of Radiology, Jun. 1999.
"Real-time Portal Monitoring to Estimate Dose to Skin of Patients from High Dose Fluoroscopy", Wagner et al., The British Journal of Radiology, Sep. 1999.
"Real-Time Quantification and Display of Skin Radiation During Coronary Angiography and Intervention", Ad den Boer et al., Circulation 2001; 104: 1779-1784.
"Comparison of Four Techniques to Estimate Radiation Dose to Skin During Angiographic and Interventional Radiology Procedures", Fletcher et al., JVIR, Apr. 2002.

* cited by examiner

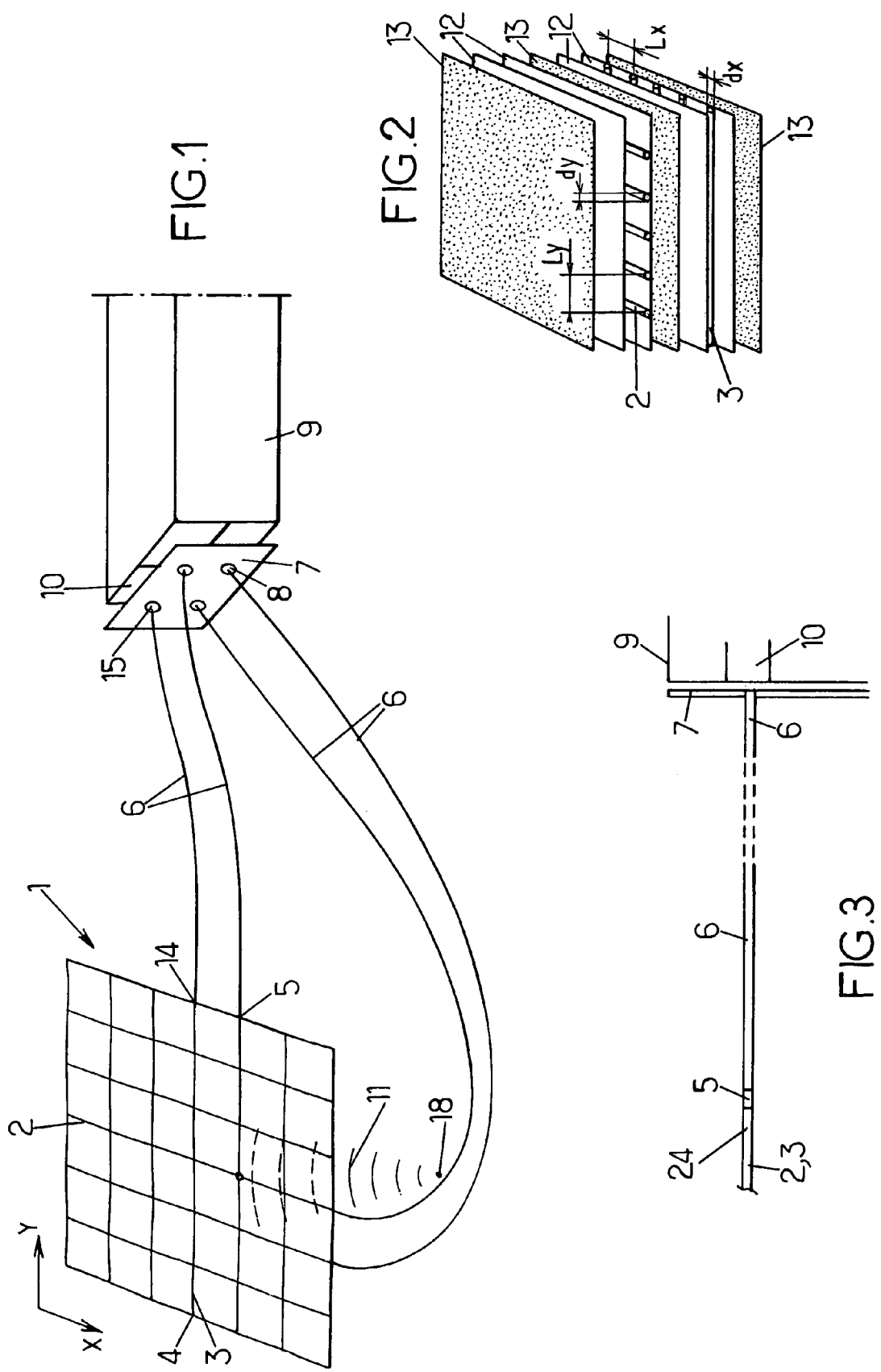

RADIO-TRANSPARENT REAL-TIME DOSIMETER FOR INTERVENTIONAL RADIOLOGICAL PROCEDURES

BACKGROUND OF THE DISCLOSURE

The present invention relates to a method of measuring in real time the dose of radiological radiation received by a region that is subjected to a flux of radiological radiation.

FIELD OF THE INVENTION

It is important to know the cutaneous dose received by a patient in real time during an examination, e.g. during vascular radiological examination, or during interventional cardiology examination, since cutaneous irradiation can lead to irreversible dermatological effects that, at present, are observed only a posteriori.

Document EP 1 167 999 describes a real-time dosimeter based on a matrix of silicon detectors. That dosimeter enables the received dose to be mapped by processing the signal delivered by each matrix cell of the detector, but it is effective only for energies of mega electron volt (MeV) order, which is an energy threshold that is well above the energies used during conventional radiological examinations. For conventional radiological procedures, document WO 00/62 092 describes a dosimeter connected via an optical fiber to a detector. That dosimeter enables a dose of radiation received by a very precisely localized zone to be determined. Nevertheless, that device does not enable a detailed map to be obtained of irradiation in the zone under examination.

Another technique enabling the dose received by a zone subjected to radiation during an examination to be obtained in real time consists in finding the dose for said zone by calculation on the basis of the dose measured at the output from a radiation emitter device. Nevertheless, that method is not suitable for determining an irradiation map since the geometry of the irradiation is subject to change.

SUMMARY OF THE DISCLOSURE

A particular object of the present invention is to mitigate those drawbacks. To this end, the invention provides a method of measuring in real time a radiological radiation dose absorbed by a region under inspection subjected to a flux of radiological radiation, the method comprising the steps consisting in:

a) detecting the incident radiation at at least one point of the region under inspection using at least a first bundle of measurement optical fibers containing at least one fiber placed in said region under inspection and adapted to generate a light signal on receiving radiological radiation;

b) measuring said light signal away from the region under inspection after it has been transmitted along the measurement optical fiber; and c) determining the dose of radiological radiation received by said measurement optical fiber on the basis of said light signal.

By means of these dispositions, a signal is obtained that is representative of the radiation transmitted through each of the optical fibers, and as a function of the locations of said optical fibers, a map can be obtained of the radiation dose transmitted to the region under inspection. This dosimeter is also X-ray transparent since the signal processor apparatuses lie away from the region under inspection, thus enabling the practitioner to act without being impeded by the dosimeter.

In preferred embodiments of the invention, recourse may optionally be had to one or more of the following dispositions:

during step c), a position where the radiological radiation is detected along said measurement optical fiber is determined, and the dose of radiological radiation received at said position is calculated as a function of at least one parameter $F^0{}_k$ specific to said optical fiber;

at least one parameter $F^0{}_k$ is obtained by a preliminary calibration step during which a dose of radiation is detected at at least one point of the region under inspection by means of a radiation detector that is not X-ray transparent;

step b) is performed using a detector device comprising at least one cell, and the parameter $F^0{}_k$ takes account of at least the optical fiber and at least one cell of the detector device associated with said fiber;

the first measurement optical fiber bundle extends in a first direction, and step a) is also performed using a second optical fiber bundle containing at least one second measurement optical fiber adapted to generate a light signal on receiving radiological radiation, and extending along a second direction forming an angle with the first direction;

steps b) and c) are performed, for at least one overlap point (i, j) between a first measurement optical fiber i of the first bundle and a second measurement optical fiber j of the second bundle, on the basis of the radiation detected at least by the first optical fiber i of the fibers of the first bundle, of the radiation detected by the second optical fiber j, and of the position of said overlap point (i, j) along the second optical fiber j;

the steps b) and c) are performed, at least for an overlap point (i, j) between a first measurement optical fiber i of the first bundle and a second measurement optical fiber j of the second bundle, on the basis of the radiation detected at least by the second optical fiber j of the fibers in the second bundle, of the radiation detected by the first optical fiber i, and of the position of said overlap point (i, j) along the first optical fiber i;

the method further comprises a step d) consisting in emitting an alarm signal if the accumulated received radiation dose exceeds a pre-established threshold;

the method further comprises a step e) consisting in displaying on a screen the dose of radiation received at at least one point of the region under inspection;

the method further comprises a step f) consisting in detecting the radiation transmitted through the region under inspection, and in displaying on a screen the radiographic image as detected in this way;

the radiographic image obtained in step f) and the image of the received radiation dose as obtained in step e), are displayed on the same screen;

at least steps a), b), and c) are repeated for a plurality of points of the region under inspection, enabling a map to be obtained of the dose received by the region under inspection;

at least steps a), b), and c) are repeated for a plurality of measurement time intervals enabling time variation in the dose received at at least one point of the region under inspection to be obtained;

the radiation is generated by a pulsed source, and the repetition of at least steps b) and c) is synchronized with said source; and at least steps a), b) and c) are performed for at least two angles of incidence of the radiation, and combined use is made of the received radiation doses as determined in step c) for each of the angles of incidence.

In another aspect, the invention provides a device for real-time measurement of a dose of radiological radiation absorbed by a region under inspection subjected to a flux of radiological radiation, the device comprising:

a dosimeter comprising at least a first bundle of measurement optical fibers containing at least one fiber placed in said region under inspection and adapted to generate a light signal on receiving radiological radiation in order to detect the incident radiation at at least one point of the region under inspection;

measurement means for measuring said light signal away from the region under inspection after the light signal has been transmitted along the measurement optical fiber; and means for determining the dose of radiological radiation received by said measurement optical fiber on the basis of said light signal.

This device also comprises one or more of the following dispositions:

the light signal is transmitted to a detector device used for measuring it, transmission taking place along the measurement optical fiber used for detecting the radiation, said fiber having a first end, and along at least one clear optical fiber extending from a first end of the clear fiber that is connected to the first end of the measurement optical fiber to a second end of the clear fiber, which second end is placed facing the detector device, and the means for determining the dose of radiation received at said point of said measurement optical fiber comprise a control unit containing parameters that are specific to the optical fibers used;

the first fiber bundle is disposed along a first direction and the dosimeter further comprises a second bundle of optical fibers comprising at least one second measurement optical fiber disposed in a second direction forming an angle with the first direction;

each measurement optical fiber is comprised between two optically-insulating sheets;

each measurement optical fiber is molded in a reflective resin comprised between two optically-insulating sheets; and at least one bundle of optical fibers is integrated in an examination table.

In another aspect, the invention also provides a radiological installation comprising:

a dosimeter comprising at least one bundle having at least one measurement optical fiber placed in a region under inspection, and adapted to generate a light signal on receiving radiological radiation, so as to enable the incident radiation to be detected at at least one point of said region under inspection;

measurement means for measuring said light signal away from the region under inspection after it has been transmitted along the measurement optical fiber; and means for determining the dose of radiological radiation received by said measurement optical fiber on the basis of said light signal, and further comprising:

a radiation generator;

a radiographic detector; and means for displaying the radiation dose received, said means also enabling radiographic images to be displayed of the region under inspection as supplied by the radiographic detector.

This installation may also comprise one or more of the following dispositions:

the installation further comprises an examination table;

at least one bundle of measurement optical fibers is integrated in the examination table; and the installation further comprises at least one additional device that is not integrated in the examination table, for real-time measurement of a dose of radiological radiation absorbed by a region under inspection subjected to a flux of radiological radiation, the additional device comprising:

at least an additional first bundle comprising at least one additional first measurement optical fiber placed in said region under inspection and adapted to generate an additional light signal on receiving radiological radiation, in order to detect the incident radiation at at least one point in said region under inspection;

additional measurement means for measuring said additional light signal away from the region under inspection after it has been transmitted along the additional measurement optical fiber; and additional means for determining the dose of radiological radiation received by said additional measurement optical fiber on the basis of said additional light signal.

Other aspects, objects, and advantages of the invention appear on reading the description of various embodiments given as non-limiting examples.

BRIEF DESCRIPTION OF THE DRAWINGS

The invention can also be better understood with the help of the drawings, in which:

FIG. 1 is a diagram showing the implementation of the method of the invention;

FIG. 2 is an exploded view in perspective showing an example of a dosimeter of the invention;

FIG. 3 shows the step of transmitting optical information in accordance with the invention;

DETAILED DESCRIPTION OF THE DISCLOSURE

Figure 4:
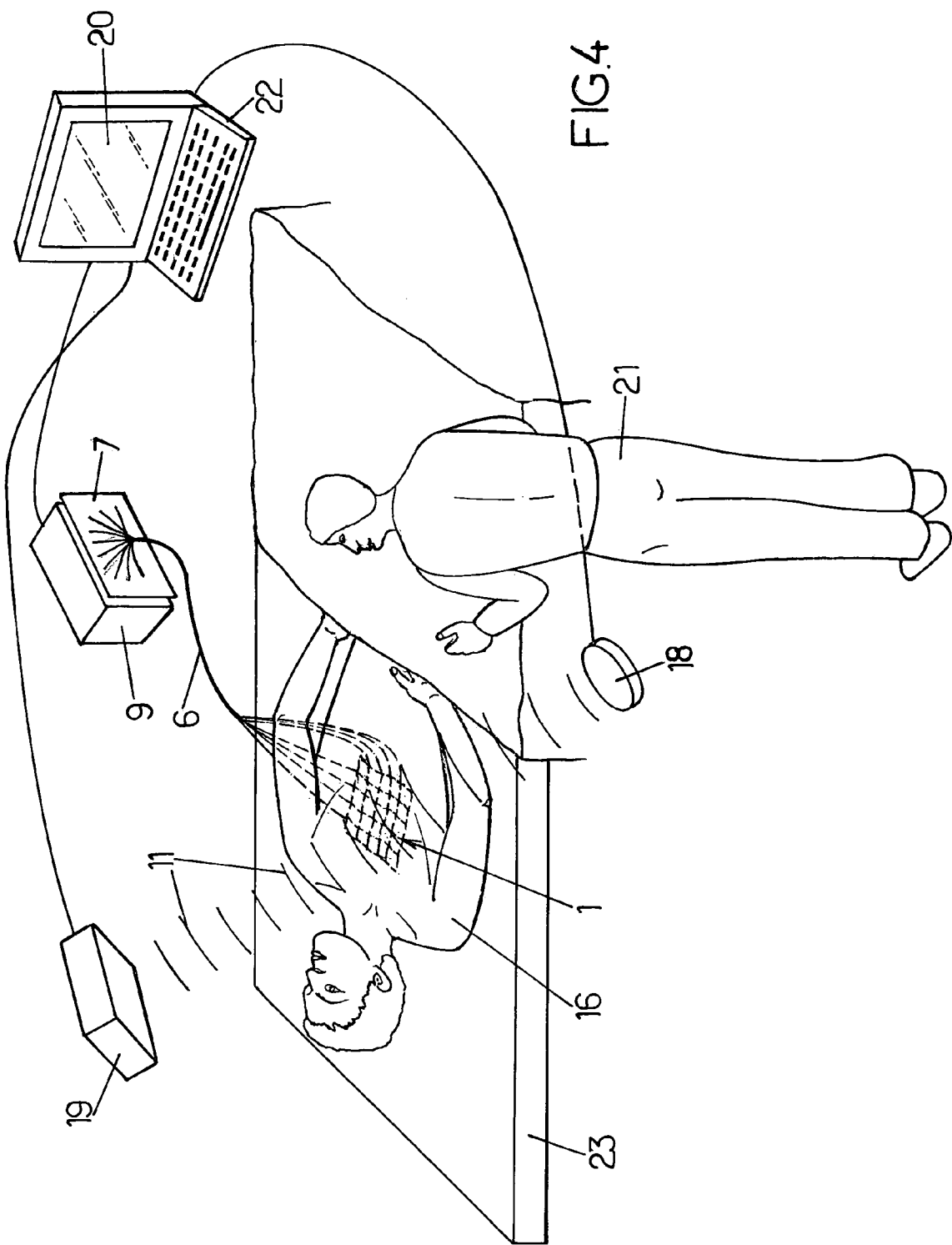
FIG. 4 shows a first embodiment of an installation implementing the method of the invention.

In the various figures, the same references are used to designate elements that are identical or similar.

In FIG. 1, a dosimeter 1 of rectangular or other shape comprises first measurement fibers 2 extending along a first direction X of the dosimeter, and second measurement optical fibers 3 extending along a second direction Y of the dosimeter. Each of these measurement optical fibers 2 and 3 has a first end 5 connected to a clear fiber 6 and a second end 4 that is optically closed or that is reflective. Each of the clear fibers 6 extends from a first end 14 of the clear fiber 6 where it is connected to the first end 5 of the measurement fiber 2, 3 to a second end 15 of the clear fiber 6 where it is engaged with a detector 9. The second end 15 of each clear fiber 6 can be mounted in a respective orifice 8 of an adapter 7 placed facing the detector 9 so as to ensure that the clear fiber 6 is properly positioned. By way of example, the detector 9 may be a multiple cell detector in which each of the cells 10 is placed facing one of the orifices 8 of the adapter 7. If radiation 11 coming from a source of radiation 18 passes through a measurement optical fiber 2, 3 extending along the first or the second direction of the dosimeter, then a light signal is conveyed along the measurement fiber and along the clear fiber that is connected thereto until it reaches the detector 9, possibly via the corresponding orifices 8 in the adapter 7. With a weak signal, it may be advantageous to cause the second end 4 of the measurement optical fiber 2, 3 to be reflective. The frequency of the events measured by the detector device enables the dose received by the measurement optical fiber to be calculated. Since the measurement of an event in a first direction and the measurement of the same event in a second direction cannot be caused to coincide in order to evaluate the point at which the event took place, it is preferred to use a statistical method as described below.

If a multi-channel detection device is used, such as a multi-anode photomultiplier tube (MAPMT), there is also the problem of considerable gain dispersion amongst the channels. The gain of each electronic channel associated with the MAPMT may be initially adjusted (once and forever, or periodically, or prior to each utilization, for example) so as to make the level of a photoelectron signal uniform by fixing an identical discrimination threshold level for all of the electron channels.

FIG. 2 shows a first embodiment of the dosimeter of the invention. A first set of measurement optical fibers 2 of diameter $d_y$ are aligned along a first direction X of the dosimeter at a pitch, e.g. a constant pitch, of $L_y$. These first measurement optical fibers are disposed between two sheets of a material 12, e.g. a reflective material, serving to hold the optical fibers. The component as prepared in this way is in turn placed between two sheets of an optically-insulating material 13. This operation is repeated in a second direction Y of the dosimeter for the second measurement optical fibers 3 of diameter $d_x$, and at a spacing or pitch $L_x$. The two resulting components are then superposed, e.g. so that the first optical measurement fibers and the second optical measurement fibers form between them an angle of about 90°. As shown in FIG. 2, it is also possible to remove one of the sheets of optically-insulating material 13 that lies between the two layers of measurement optical fibers. The dosimeter as built up in this way is completely X-ray transparent, which is an essential condition for enabling such a dosimeter to be used so as to ensure that it does not impede the practitioner during intervention. Nevertheless, these measurement fibers are not necessarily disposed in two separate planes, and they could, for example, constitute a single plane of woven fibers.

FIG. 3 shows the path followed by optical information from detection by the measurement optical fiber until the detector 9 is reached. In particular, it is necessary to connect the measurement optical fibers 2, 3 at their first ends 5 to the clear optical fibers 6 which extend them, with the connection being made by means of adhesive, for example, or by any other bonding means enabling optical information to be transmitted. The first ends 5 of the measurement fibers 2, 3 and the first ends 14 of the clear fibers 6 are polished and they are placed facing one another in pairs so as to be stuck together with an optical adhesive of refractive index close to that of the material used in the optical fibers. In order to ensure that the cores and the cladding of the fibers are accurately aligned during the application of adhesive, each pair of fibers may be held in a tube or "ferrule" of Teflon or other rigid material, which then remains permanently in position in order to guarantee a mechanically robust optical connection. The second end 15 of each clear fiber 6 where it is inserted in an orifice 8 of the adapter 7 can likewise be polished and the surface of the second end 15 of each outputting clear fiber 6 can be bonded with adhesive so as to ensure proper optical coupling with the plane inlet window of the detector.

The second end 4 of each measurement optical fiber 2, 3 may also be connected to a second clear optical fiber 6 in similar manner. Naturally, under such circumstances, the second end 4 of each measurement optical fiber 2, 3 is neither optically closed nor reflective. The second end 15 of each second clear fiber can then be placed facing a cell of the detector 9 in the manner defined above. For each given measurement fiber 2, 3 this second end may alternatively be placed close to the second end 15 of the first clear fiber 6 whose first end 14 is connected to the first end 5 of a given optical fiber 2, 3, such that the signals coming from the first and second clear fibers 6 connected to the same measurement fiber 2, 3 are added together by the detector.

It may be necessary to evaluate the dispersion in the responses of the detection channels of the device. Although the characteristics of the measurement fibers 2, 3 and of the clear fiber 6 are guaranteed to present little dispersion, the reproducibility of the quality of the optical bonding between them needs to be studied, as does the dispersion of the channels of the detector device. For given radiation flux, the count rate of each detection channel differs as a function of the following:

the intrinsic dispersion between the measurement fibers 2, 3;

the quality of the optical bonding between the measurement fibers 2, 3 and the clear fibers 6;

the quality of the fiber cladding; and the dispersion of the channels of the detector device when using a multi-channel detector device.

To calibrate the device of the invention, a known portion 24 of each measurement fiber 2, 3, e.g. a portion situated directly upstream from its first end 5 where the measurement fiber 2, 3 is bonded to a clear fiber 6, is subjected to radiation coming from a radiation source under voltage V and current I, thus corresponding directly to a known dose value f previously measured by conventional means such as an ionization chamber (not X-ray transparent). By measuring the count frequency $C^0_k$ at the output from the detector device, it is thus possible to establish a correlation for each fiber between the dose received by the detector portion 24 of each measurement fiber k and the measured frequency. Once calibration has been performed, the set of area dosage values per count unit $F^0_k=f/C^0_k*sc$, corresponding to a given fiber k or to a fiber and multi-channel detector channel in association, is stored in a control unit 22. The term sc represents the equivalent area of the detector fiber. Depending on the type of detector used, the measured energy or some other parameter, particularly count frequency, may optionally be associated with the received dose. These calibration operations, which are performed during the design of the installation of the invention, need be performed subsequently only occasionally, e.g. during maintenance operations on the installation.

In addition, each associated optical fiber and detector channel can be calibrated separately by calibrating firstly the optical fibers by placing a single detector to face each of the second ends 15 of the clear fiber 6, e.g. a single-celled detector. Furthermore, the channels of the multi-cellular detector can be calibrated separately, e.g. by causing each channel to measure a known given signal. The calibration value $F^0_k$ for an optical fiber and the associated detector channel is then obtained by combining the value obtained for the fiber on its own with the value obtained separately for the facing channel of the detector. By way of example, this approach makes it possible, in use, to replace one or other of these two pieces of equipment, should it be found to be defective, without it being necessary to replace both of them.

Since the measurement fibers 2, 3 have known characteristics, if it is known that the radiation dose has been received at a distance d from the detector portion 24 of the measurement fiber k along said fiber, it is possible to determine the count that would have been measured if the detection had occurred in said detection portion 24 on the basis of the count measured at the output from the detector, and using the attenuation length $\lambda_{att}$ of the measurement fibers in application of the following formula:

$$C_k^d = C_k^0 e^{-\left(\frac{d}{\lambda_{att}}\right)}$$

FIG. 4 shows an embodiment of a installation implementing the method of the invention. The dosimeter 1 is constituted by two crossed planes each of 32 scintillating fibers having a diameter of 1 millimeter (mm), woven at a pitch of 10 mm, thus covering a detection area of about 310 mm×310 mm. The pitch is representative of the resolution of the resulting dose map, and the selected detection area is representative of the investigation zones used in applications of this type, but these two parameters can naturally be modified. The scintillating fibers 2, 3 used in the dosimeter are of doped polystyrene with two claddings. For example, it is possible to use "blue" Polifi 02 44-100 fibers from POL-HI-TECH, Italy, having an emission spectrum centered on 438 nanometers (nm) and a mean attenuation length of 500 mm, with a decay time of 2.3 nanoseconds (ns). It is also possible to use "green" Y11 (175) MJ non-S scintillating fibers from Kuraray, Japan having an emission spectrum centered on 500 nm, a mean attenuation length of 900 mm, and a decay time of 7.1 ns, or any other type of fast measurement fiber, whether or not it is made of polystyrene. In this type of application, the use of polystyrene is justified because it has density close to that of the skin, and because of its high degree of flexibility. In this case, the component 12 is made of mylar presenting a density of 1.35 grams per cubic centimeter ($g/cm^3$), and is made up of sheets having a thickness of 0.045 mm. In this example, the optically-insulating component 13 is black polycarbonate, having density of 1.2 $g/cm^3$, and implemented in the form of sheets having a thickness of 0.015 mm. An epoxy adhesive is used for bonding together the measurement optical fibers 2, 3 and the sheets 12 and 13. The total thickness of the resulting detector is about 2.4 mm.

To obtain greater flexibility for the dosimeter, and to enable the radiation dose received by regions having a short radius of curvature to be evaluated, it is possible to use measurement fibers 2, 3 of smaller diameter, and consequently clear fibers 6 of corresponding size and orifices 8 of corresponding size in the adapter 7. Instead of being stuck between sheets, the measurement fibers 2, 3 may alternatively be incorporated in a molding, e.g. of black resin.

Each measurement optical fiber 2, 3 is about 310 mm long, and it is bonded to a polystyrene clear fiber, e.g. of the Kurakay type having a single layer of cladding, a length of about 1400 mm, and a diameter of about 1 mm, with the first ends 5 of the measurement fibers 2, 3 and the first ends 14 of the clear fibers 6 being initially polished with abrasive powder, initially of grain size 600P and subsequently 1200P. By way of example, the clear fibers 6, which are long, may alternatively be fibers made of quartz that possess better transmission, or fibers made of polymethyl methacrylate (PMMA), or other fibers. In this example, only one clear fiber 6 is used per measurement fiber 2, 3, but in an alternative it would be possible to connect each measurement fiber 2, 3 to a clear fiber at each of its ends 4, 5 as explained above. The free ends of the 64 clear fibers are grouped together on an adapter which is a mechanical part made of black plastics material and pierced by 64 holes each having a diameter of about 1.05 mm and at a pitch of 2.3 mm. It is thus possible to obtain an 8×8 matrix of clear fibers 6 placed facing cells 10 of the detector 9, which in this example is a MAPMT photo multiplier having 64 channels and supplied under the reference Hamamatsu H7546 MOD. This detector has an inlet window measuring about 20 mm×20 mm. To provide light-tightness for the clear fibers 6, assuming they are not optically insulated, it is possible to envelop them in black polycarbonate sheathing, or in black polyethylene, or the like. Under such circumstances, each fiber may have a diameter that is smaller than the diameter of the associated scintillating fiber 2, 3 such that each assembly comprising a clear fiber and a sheath presents a diameter of the same order as the diameter of the associated scintillating fiber. The MAPMT detector is fitted with integrated analog electronics (two 32-channel chips) with sensitivity at the level of a fraction of a photoelectron. Each electron channel includes a discriminator with a programmable threshold for delivering a digital signal that is used by being counted up to a frequency of 10 megahertz (MHz).

The flexible and light-tight dosimeter 1 is for placing against the body of the person under examination. In FIG. 4, the dosimeter is thus placed under the body of the patient between the radiation source 18 and the patient 16. The dosimeter is placed in register with the inlet face of the radiation beam 11, e.g. an X-ray beam, as produced by a tube 18 situated on a moving cradle (not shown). The emitted X-ray beam may be emitted in pulsed form, in which case the detector device can be synchronized by performing detection for each X-ray pulse, with calculations being performed between two given pulses. For example, during an interventional radiological examination performed using an X-ray apparatus operating in pulsed mode, with pulses having a duration of about 7 milliseconds (ms) and being repeated once every 40 ms, the detector can be supplied with a synchronizing signal of the same duration as an X-ray pulse, thereby causing counting to be performed on the fibers during exposure. The time available between taking measurements (of the radiation) is then used for reading the individual count registers, for storing the data, for calculating the dose received per unit area at each of the points (i, j) of the dosimeter, and thus by the irradiated organ, and for updating the display.

If the X-ray beam X is emitted continuously, detection can still be performed during a time td and calculation during a time $t_c$ in periodic manner giving a period $T = t_d + t_c$, with the total radiation being determined by comparing the calculated dose received during the duration td with the dose received throughout the duration T, e.g. by simple proportionality.

The transmitted X-ray beam may also be detected by a detector 19 which transmits radiological information to a central unit 22. In addition, the dose passing through each measurement fiber 2, 3 of the dosimeter 1, and thus reaching the object under examination, is transformed into optical information conveyed via the clear fibers 6 to the multi-channel detector 9. The signals coming from the photomultiplier MAPMT are processed therein by two integrated circuits each having 32 channels. After the signals have been shaped, this circuit is capable of delivering sequentially (channel after channel) the charge collected on each anode of the MAPMT by means of a signal of amplitude that is proportional to said charge, and thus to the detected radiation in application of the calibration values $F^0_k$ stored in the control unit 22. This output signal is digitized by an analog-to-digital converter (ADC), e.g. contained in the central unit 22, so as to provide information that can be displayed on a monitor screen

20. The circuit also provides a logic signal that is activated each time a photoelectron is produced at the photocathode of the MAPMT. Measuring the frequency of this logic signal enables the activity of each channel to be measured, and consequently serves to measure the quantity of radiation picked up by each of the measurement optical fibers 2 extending in rows in a first direction of the dosimeter and the measurement optical fibers 3 extending in columns in a second direction of the dosimeter. Since the logic signal is the sum of the signals associated with each channel, it is possible to measure individually the activity of a selected measurement optical fiber 2, 3 by inhibiting all of the channels other than the selected channel so as to conserve only the frequency corresponding to the selected measurement optical fiber. This same operation is then performed on each of the channels, thus leading to the individual measurement of the dose received by each of the fibers.

Alternatively, a logic signal may be associated with each channel, thus enabling counts to be measured simultaneously on all of the 32 channels for each pulse of the X-ray beam.

On the basis of the frequencies $R_i$ and $C_j$ measured respectively on the row i and the column j of the dosimeter, a first estimate of the dose $D_{ij}$ per unit area received at the point having coordinates (i, j) of the dosimeter can be obtained in application of the following formula:

$$D_{ij} = \frac{R_i}{F_i^0} \times \frac{C_j}{\sum C_k} \times e^{\frac{d_{ij}}{\lambda_{att}}}$$

where $d_{ij}$ is the distance of the fiber j from the first end of the fiber i.

By symmetry, it is possible to obtain a second estimate of the dose per unit area $D_{ij}$ received at the same point in application of the following formula:

$$D_{ij} = \frac{C_j}{F_j^0} \times \frac{R_i}{\sum R_k} \times e^{\frac{d_{ji}}{\lambda_{att}}}$$

where $d_{ji}$ represents the distance of the fiber i from the first end of the fiber j.

Naturally, during a measurement, the sum over all of the rows of the measured counts is equal to the sum over all of the columns of the measured counts and corresponds to the total intensity.

It is possible to use one, or the other, or a weighted average of these two values to estimate the dose per unit area received at the point (i, j) under consideration. The calculated values are then shown on the screen 20, and this is done at a speed that is fast enough to enable the data on the screen 20 to be refreshed quickly. In addition, since the cutaneous dose per unit area $D_{ij}$ is calculated in two different ways, it is possible to monitor measurement reliability and to detect possible failure of the dosimeter by comparing the two values. Thereafter, if it is desired to use measurement fibers of better quality in one of the directions of the dosimeter while retaining measurement fibers of lower quality in the second direction, so as to avoid increasing production costs excessively, it is possible to weight the results obtained by calculation performed on the basis of the frequency measurement obtained from the higher performance fibers, so that this number is preponderant in the result obtained.

The frequency of the logical signal (directly associated with the dose received by each measurement optical fiber) is counted in a field programmable gate array (FPGA) type circuit. A digital signal processor (DSP) performs the following operations:
  managing the high voltage of the MAPMT, as generated locally by a compact Hamamatsu CA 4900-01 module;
  configuring the integrated circuits;
  reading the temperature of the unit; and
  communicating with the control unit.

This communication with the control unit 22 consists in regularly reassessing the count data so as to refresh the display on the screen 20, enabling the user 21 to define operating parameters, such as utilization mode, MAPMT voltage, or sensitivity level of the electronic cards, etc.

It is thus possible for the user 21 to monitor in real time on the screen 20 a map of the cutaneous radiation dose, both in terms of accumulated dose and in terms of instantaneous dosage rate for each exposed zone. The control unit 22 or the user 21 can then take account of the information displayed on the screen 20 in determining how therapy is to progress. If the accumulated cutaneous radiation dose in a region or over the entire irradiated extent exceeds a certain pre-established threshold, the control unit can be arranged to trigger an alarm, for example. During the operation, the X-ray beam 11 may optionally be reorientated or moved by the user 21, e.g. in the event of the person under examination 16 moving on the examination table 23. Such movement may be forwarded automatically to the central unit 22 or it may be input as a parameter by the user 21. In the event of a large movement, it can be necessary to modify the parameters specific to each measurement optical fiber 2, 3 since they might have been calibrated for only a given set of positions of the radiation source.

In addition, the received radiation doses may be coupled with a database for long-term monitoring of the person under examination, possibly associated with studying the effects of that person's exposure to the radiation, and with the irradiated zone being accurately identified relative to the anatomy of the person under examination, during each operation.

Figure 5:
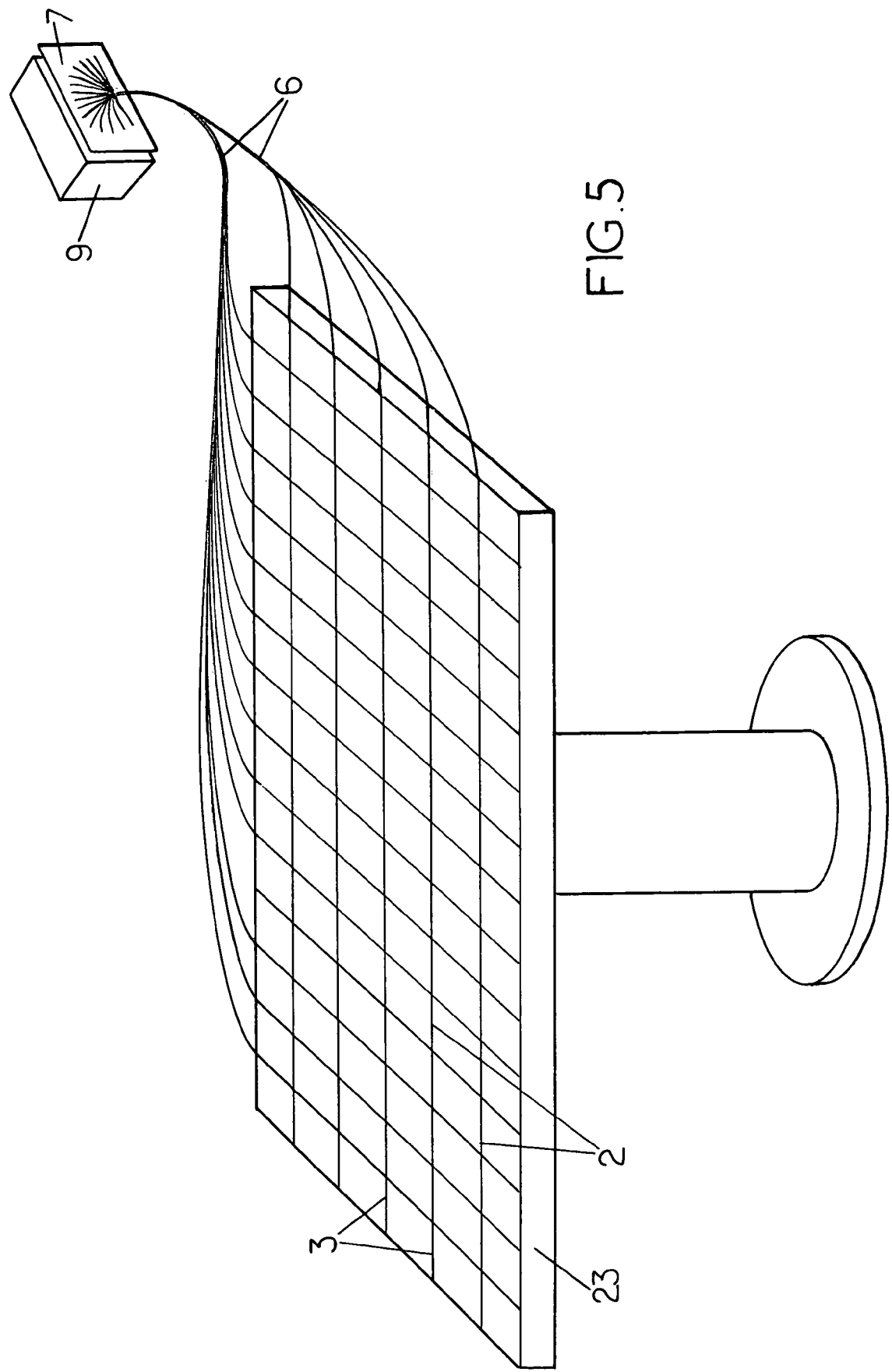
FIG. 5 shows a second embodiment of an installation enabling the method of the invention to be implemented.

FIG. 5 shows a second embodiment of an installation implementing the method of the invention. In this case, the dosimeter 1 is incorporated in the examination table 23 so as to cover all postero-anterior incidences of X-rays to which a person under examination might be subjected. The pitch of the measurement fibers 2, 3 may optionally be adapted accordingly. Thus, a plurality of dosimeters may be integrated in the examination table in register with those portions of the body that are the most investigated, and they may be connected simultaneously or successively to a common detector device. Such a "whole body" dosimeter integrated in the examination table and covering practically all of its surface area can be used on its own or in association with additional "surface" dosimeters that are not integrated and that are used in the manner shown in FIG. 4. Such a device may be advantageous in the fields of interventional radiology and conventional or interventional tomography. Such an examination table 23 may contain a plurality of housings suitable for receiving integrated dosimeters either simultaneously or in succession.

The invention claimed is:
  1. A method of measuring in real time a radiological radiation dose absorbed by a region under inspection subjected to a flux of radiological radiation, the method comprising the steps consisting in:
    a) detecting the incident radiation at at least one point of the region under inspection using an X-ray transparent dosimeter comprising at least a first bundle of measurement optical fibers containing at least one fiber placed in said region under inspection and adapted to generate a light signal on receiving radiological radiation;

b) measuring said light signal away from the region under inspection after it has been transmitted along the measurement optical fiber; and c) determining the dose of radiological radiation received by said measurement optical fiber on the basis of said light signal and a position where the radiological radiation is detected along said measurement optical fiber, the dose of radiological radiation received at said position being calculated as a function of at least one parameter $F^0_k$ specific to said optical fiber.

2. A method according to claim 1, in which at least one parameter $F^0_k$ is obtained by a preliminary calibration step during which a dose of radiation is detected at at least one point of the region under inspection by means of a radiation detector that is not X-ray transparent.

3. A method according to claim 1, in which step b) is performed using a detector device comprising at least one cell, and in which the parameter $F^0_k$ takes account of at least the optical fiber and at least one cell of the detector device associated with said fiber.

4. A method according to claim 1, further comprising a step d) consisting in emitting an alarm signal if the accumulated received radiation dose exceeds a pre-established threshold.

5. A method according to claim 1, further comprising a step e) consisting in displaying on a screen the dose of radiation received at least one point of the region under inspection.

6. A method according to claim 5, further comprising a step f) consisting in detecting the radiation transmitted through the region under inspection, and in displaying on a screen a radiographic image as detected in this way.

7. A method according to claim 6, in which the radiographic image obtained in step f) and the image of the received radiation dose as obtained in step e), are displayed on the same screen.

8. A method according to claim 1, in which at least steps a), b), and c) are repeated for a plurality of points of the region under inspection, enabling a map to be obtained of the dose received by the region under inspection.

9. A method according to claim 1, in which at least steps a), b), and c) are repeated for a plurality of measurement time intervals enabling time variation in the dose received at at least one point of the region under inspection to be obtained.

10. A method according to claim 9, in which the radiation is generated by a pulsed source, and the repetition of at least steps b) and c) is synchronized with said source.

11. A method according to claim 1, in which at least steps a), b) and c) are performed for at least two angles of incidence of the radiation, and in which combined use is made of the received radiation doses as determined in step c) for each of the angles of incidence.

12. A device for real-time measurement of a dose of radiological radiation absorbed by a region under inspection subjected to a flux of radiological radiation, the device comprising: an X-ray transparent dosimeter comprising at least a first bundle of measurement optical fibers containing at least one fiber placed in said region under inspection and adapted to generate a light signal on receiving radiological radiation in order to detect the incident radiation at least one point of the region under inspection; measurement means for measuring said light signal away from the region under inspection after the light signal has been transmitted along the measurement optical fiber; and means for determining the dose of radiological radiation received by said measurement optical fiber on the basis of said light signal; and in which the light signal is transmitted to a detector device used for measuring it, transmission taking place along the measurement optical fiber used for detecting the radiation, said fiber having a first end, and along at least one clear optical fiber extending from a first end of the clear fiber that is connected to the first end of the measurement optical fiber to a second end of the clear fiber, which second end is placed facing the detector device, and in which the means for determining the dose of radiation received at said point of said measurement optical fiber comprise a control unit containing parameters that are specific to the optical fibers used.

13. A device according to claim 12, in which each measurement optical fiber is comprised between two optically-insulating sheets.

14. A device according to claim 12, in which each measurement optical fiber is molded in a reflective resin comprised between two optically-insulating sheets.

15. A device for real-time measurement of a dose of radiological radiation absorbed by a region under inspection subjected to a flux of radiological radiation, the device comprising: an X-ray transparent dosimeter comprising at least a first bundle of measurement optical fibers containing at least one fiber placed in said region under inspection and adapted to generate a light signal on receiving radiological radiation in order to detect the incident radiation at least one point of the region under inspection; measurement means for measuring said light signal away from the region under inspection after the light signal has been transmitted along the measurement optical fiber; and means for determining the dose of radiological radiation received by said measurement optical fiber on the basis of said light signal; and in which the first fiber bundle is disposed along a first direction and in which the dosimeter further comprises a second bundle of optical fibers comprising at least one second measurement optical fiber disposed in a second direction forming an angle with the first direction.

16. A device according to claim 15, in which each measurement optical fiber is comprised between two optically-insulating sheets.

17. A device according to claim 15, in which each measurement optical fiber is molded in a reflective resin comprised between two optically-insulating sheets.

18. A device for real-time measurement of a dose of radiological radiation absorbed by a region under inspection subjected to a flux of radiological radiation, the device comprising: an X-ray transparent dosimeter comprising at least a first bundle of measurement optical fibers containing at least one fiber placed in said region under inspection and adapted to generate a light signal on receiving radiological radiation in order to detect the incident radiation at least one point of the region under inspection; measurement means for measuring said light signal away from the region under inspection after the light signal has been transmitted along the measurement optical fiber; and means for determining the dose of radiological radiation received by said measurement optical fiber on the basis of said light signal; and in which at least one bundle of optical fibers is integrated in an examination table.

19. A radiological installation comprising: an X-ray transparent dosimeter comprising at least one bundle having at least one measurement optical fiber placed in a region under inspection, and adapted to generate a light signal on receiving radiological radiation, so as to enable the incident radiation to be detected at least one point of said region under inspection;

measurement means for measuring said light signal away from the region under inspection after it has been transmitted along the measurement optical fiber; and means for determining the dose of radiological radiation received by said measurement optical fiber on the basis of said light signal, and further comprising: a radiation generator; a radiographic detector; and means for displaying the radiation dose received, said means also enabling radiographic images to be displayed of the region under inspection as supplied by the radiographic detector; an examination table; and wherein said at least one bundle of measurement optical fibers is integrated in the examination table.

20. An installation according to claim 19, further comprising at least one additional device that is not integrated in the examination table, for real-time measurement of a dose of radiological radiation absorbed by a region under inspection subjected to a flux of radiological radiation, the additional device comprising: at least an additional first bundle comprising at least one additional first measurement optical fiber placed in said region under inspection and adapted to generate an additional light signal on receiving radiological radiation, in order to detect the incident radiation at least one point in said region under inspection; additional measurement means for measuring said additional light signal away from the region under inspection after it has been transmitted along the additional measurement optical fiber; and additional means for determining the dose of radiological radiation received by said additional measurement optical fiber on the basis of said additional light signal.

21. A method of measuring in real time a radiological radiation dose absorbed by a region under inspection subjected to a flux of radiological radiation, the method comprising the steps consisting in:

a) detecting the incident radiation at at least one point of the region under inspection using an X-ray transparent dosimeter comprising at least a first bundle of measurement optical fibers extending in a first direction and containing at least one fiber placed in said region under inspection and adapted to generate a light signal on receiving radiological radiation, and a second optical fiber bundle containing at least one second measurement optical fiber adapted to generate a light signal on receiving radiological radiation, and extending along a second direction forming an angle with the first direction;

b) measuring said light signal away from the region under inspection after it has been transmitted along the measurement optical fiber; and c) determining the dose of radiological radiation received by said measurement optical fiber on the basis of said light signal.

22. A method according to claim 21, in which steps b) and c) are performed, for at least one overlap point between a first measurement optical fiber of the first bundle and a second measurement optical fiber of the second bundle, on the basis of the radiation detected at least by the first optical fiber of the fibers of the first bundle, of the radiation detected by the second optical fiber, and of the position of said overlap point along the second optical fiber.

23. A method according to claim 21, in which the steps b) and c) are performed, at least for an overlap point between a first measurement on the basis of the radiation detected at least by the second optical fiber of the fibers in the second bundle, of the radiation detected by the first optical fiber, and of the position of said overlap point along the first optical fiber.

* * * * *

UNITED STATES PATENT AND TRADEMARK OFFICE
CERTIFICATE OF CORRECTION

PATENT NO. : 7,441,955 B2  Page 1 of 1
APPLICATION NO. : 10/541440
DATED : October 28, 2008
INVENTOR(S) : Jean-Louis Guyonnet et al.

It is certified that error appears in the above-identified patent and that said Letters Patent is hereby corrected as shown below:

In the Claims:

At Column 11, line 29, "e)," should be -- e) --.

At Column 14, line 28, "measurement on" should be -- measurement optical fiber of the first bundle and a second measurement optical fiber of the second bundle, on --.

Signed and Sealed this

Ninth Day of March, 2010

David J. Kappos
*Director of the United States Patent and Trademark Office*